United States Patent [19]

Ohshima et al.

[11] Patent Number: 5,315,323
[45] Date of Patent: May 24, 1994

[54] COLOR IMAGE FORMING APPARATUS WITH MEANS FOR BIASING A RECORDING HEAD

[75] Inventors: Kiyoshi Ohshima; Yoshiyumi Tamiya, both of Yokohama; Kenichi Shimizu; Tadahiro Suzuki, both of Kawasaki; Kazuaki Iizuka, Tokyo, all of Japan

[73] Assignee: Ricoh Company, Ltd., Tokyo, Japan

[21] Appl. No.: 854,905

[22] Filed: Mar. 20, 1992

[30] Foreign Application Priority Data

Mar. 22, 1991 [JP] Japan .................................. 3-058800

[51] Int. Cl.⁵ .............................................. G01D 15/06
[52] U.S. Cl. ................................... 346/159; 346/155; 346/157
[58] Field of Search ................ 346/155, 157, 160.1, 346/159, 183.1, 134

[56] References Cited

U.S. PATENT DOCUMENTS

| | | | |
|---|---|---|---|
| 4,074,283 | 2/1978 | Fink et al. | 346/155 X |
| 4,217,819 | 8/1980 | von Tluck et al. | 346/153.1 |
| 4,257,054 | 3/1981 | Ishikawa | 346/155 |
| 4,258,372 | 3/1981 | Ishikawa | 346/153.1 |
| 4,297,716 | 10/9181 | Hirayama et al. | 346/153.1 |
| 4,308,548 | 12/1981 | Hurkmans et al. | 346/155 X |
| 4,446,471 | 5/1984 | Yano | 346/153.1 |
| 4,524,370 | 6/1985 | Nishioka et al. | 346/155 |
| 4,569,584 | 2/1986 | St. John et al. | 346/153.1 |
| 4,577,199 | 3/1986 | Saiki et al. | 346/76 PH |
| 4,703,334 | 10/1987 | Mochimaru et al. | 346/155 X |
| 4,721,969 | 1/1988 | Asano | 346/157 |
| 4,766,446 | 8/1988 | Abe et al. | 346/136 |
| 4,819,013 | 4/1989 | Beaudet | 346/159 |
| 4,905,026 | 2/1990 | Day | 346/155 |
| 4,965,597 | 10/1990 | Ohigashi et al. | 346/157 |
| 5,025,269 | 6/1991 | Saeki et al. | 346/157 |

*Primary Examiner*—Benjamin R. Fuller
*Assistant Examiner*—Randy W. Gibson
*Attorney, Agent, or Firm*—Oblon, Spivak, McClelland, Maier & Neustadt

[57] ABSTRACT

An electrostatic plotter or similar color image forming apparatus for forming an image on a recording medium, e.g. a paper web being transported under tension by a transport roller pair by a head while sensing a register mark formed on the medium. The distance between the register mark and a register mark sensor and the distance between the paper web and the head are maintained constant.

11 Claims, 3 Drawing Sheets

COLOR IMAGE FORMING APPARATUS WITH MEANS FOR BIASING A RECORDING HEAD

BACKGROUND OF THE INVENTION

The present invention relates to an electrostatic plotter or similar color image forming apparatus for forming an image on a paper web or similar recording medium being transported under tension by a transport roller pair by a head while sensing a register mark recorded on the medium.

Color image forming apparatuses of the type recording an image on a recording medium, i.e., paper web being transported under tension by multiple roller pairs are extensively used today and include an electrostatic color plotter. It is a common practice with this type of apparatus to record a register mark in a predetermined position on a recording medium and sense it by, for example, a photosensor. The transport of the medium is controlled on the basis of the register mark to form color components expected to form a color image in accurate register on the medium. To enhance the sensing accuracy of the photosensor, the register mark is condensed by a lens and then sensed by the photosensor. However, the problem is that the medium in transport is apt to move up and down at the position where the photosensor is located, changing the distance between it, i.e., the register mark provided thereon and the lens. Then, the photosensor fails to sense the register mark accurately. A head for recording an image on the medium has to be spaced apart from the medium by a predetermined distance. Should this distance be inaccurate, especially in the main scanning direction, the quality of reproduced images would be critically degraded. In practice, however, the distance between the recording medium and the head changes when the medium is set on the apparatus or in the event of maintenance of the head. Specifically, in such an occasion, since a guide member for guiding the medium is rotated about, for example, a hinge to a retracted position, the guide member cannot be accurately restored to the original or operative position due to the play of the hinge.

SUMMARY OF THE INVENTION

It is, therefore, an object of the present invention to provide a color image forming apparatus which enhances image quality by positioning a recording medium being transported under tension by a transport roller pair with accuracy.

An image forming apparatus for forming an image on a recording medium being transported under tension and formed with a register mark of the present invention comprises a pair of transport rollers for holding the recording medium under tension, a register mark sensor for sensing the register mark formed on the recording medium, and a guide member located to face the register mark sensor for guiding the recording medium while urging the recording medium.

Also, an image forming apparatus for forming an image on a recording medium being transported under tension of the present invention comprises a pair of rollers for holding the recording medium under tension, an ion-flow record head for writing an image on the recording medium being transported by the pair of rollers, a guide member located to face the ion-flow head for guiding the recording medium while urging the recording medium, and a positioning member for maintaining the guide member at a predetermined position relative to the ion-flow record head.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
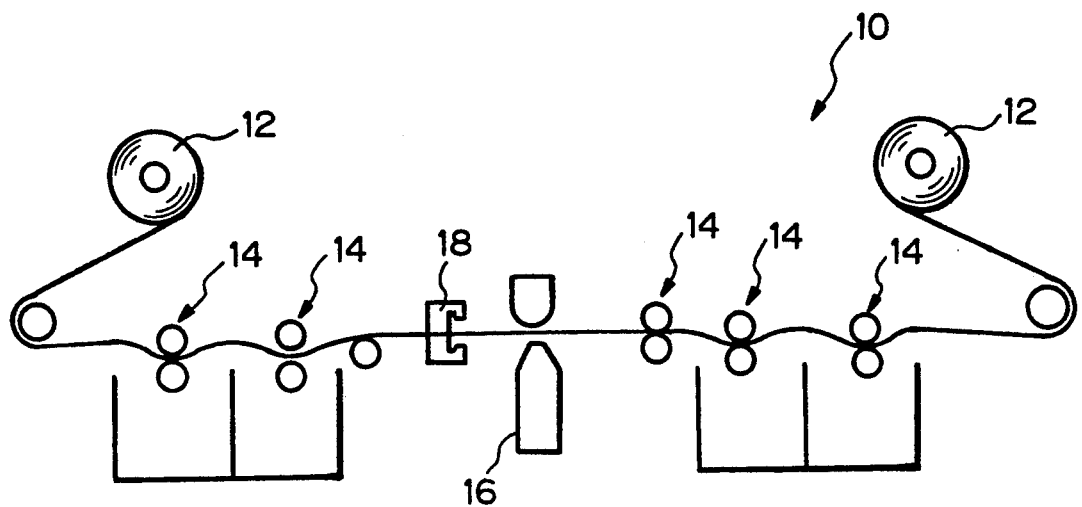
FIGS. 1-3 are views each showing a conventional color image forming apparatus implemented as an electrostatic plotter.

To better understand the present invention, a brief reference will be made to some conventional color image forming apparatuses. FIG. 1 shows a conventional color image forming apparatus implemented as an electrostatic plotter 10. As shown, a recording medium in the form of a paper web 12 is transported by a plurality of roller pairs 14 under tension while a record head 16 records an image on the paper web 12. A register mark is recorded in a predetermined position on the paper web 12 prior to the image. A photosensor or similar register mark sensor 18 senses the register mark for controlling the transport of the paper web 12. Usually, the register mark is condensed by a lens, not shown, and then sensed by the sensor 18. The problem with the plotter 10 is that the sensor 18 often fails to sense the register mark accurately since the paper web 12 is apt to move up and down at the position where the sensor 18 is located, i.e., the distance between the register mark and the lens is apt to change.

Figure 2:
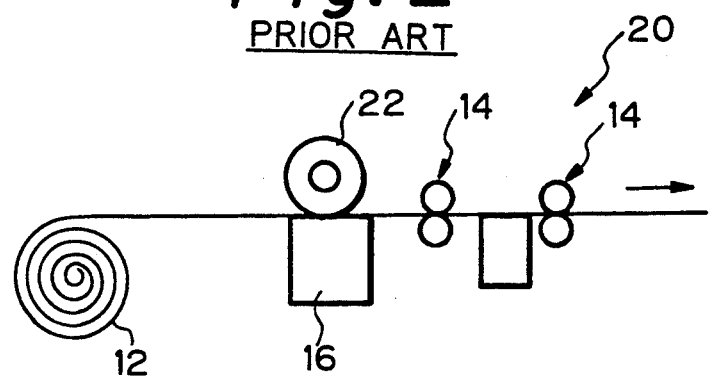

FIG. 2 shows another conventional electrostatic plotter 20 including a stylus head 16. While the paper web 12 is driven by the roller pairs 14 under tension, the head 16 records an image on the paper web 12. Generally, to record an attractive image, it is necessary for the paper web 12 and head 16 to be spaced apart by a gap of 0.3 millimeter to 0.1 millimeter. The plotter 10 is capable maintaining such a gap between the paper web 12 and the head 16 since it constantly urges the paper web 12 against the head 16 by a sponge roller 22. In practice, however, the distance between the paper web 12 and the head 16 is changed when the roll of paper 12 is set or at the time of maintenance of the head 16. Specifically, in such an occasion, a guide member, not shown, for guiding the paper web 12 is rotated about a hinge member or similar support member to a retracted position and, after the roll 12 has been set or after the maintenance of the head 16, again rotated about the support member to the original or operative position. As a result, the position of the guide member is deviated due to the potential play of the hinge portion.

Figure 3:
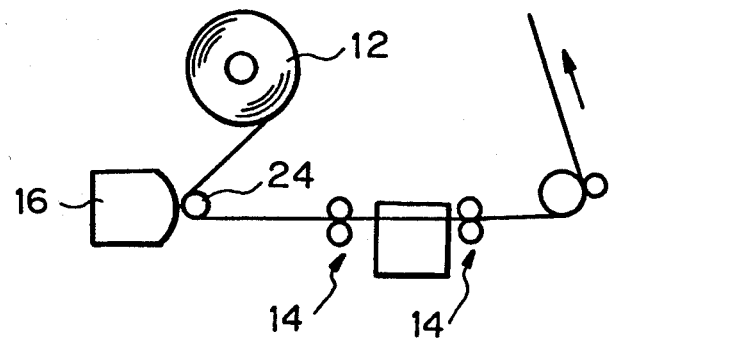

FIG. 3 shows a further conventional electrostatic plotter 30 including an ion-flow record head 16. As shown, the paper web 12 is urged by a stationary drum 24 toward the head 16 while being transported by the roller pairs 14 and is, therefore, spaced apart from the head 16 by a predetermined distance. However, the distance between the paper web 12 and the head 16 is apt to change when the roll of paper 12 is set or in the event of maintenance of the head 16, as in the plotter 20 shown in FIG. 2.

Figure 4:
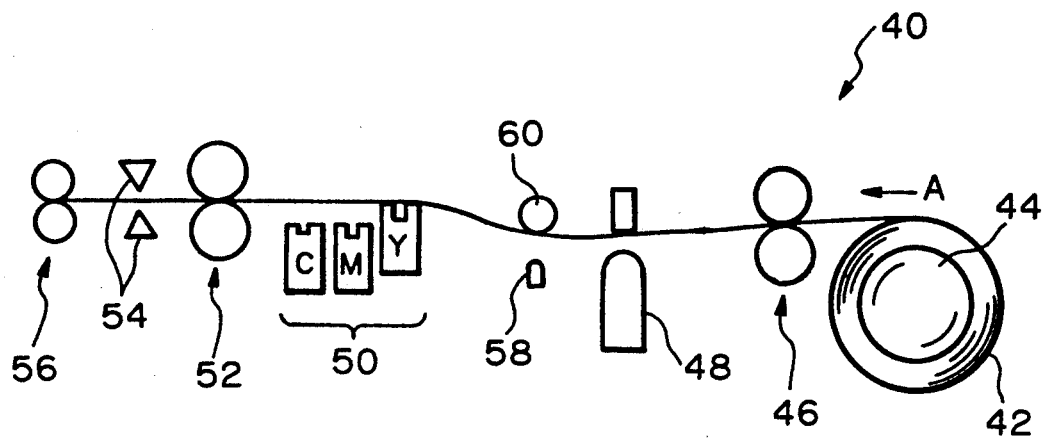
FIG. 4 is a sectional side elevation showing a color image forming apparatus embodying the present invention and also implemented as an electrostatic plotter.

Referring to FIG. 4, a color image forming apparatus embodying the present invention is shown and implemented as an electrostatic plotter by way of example. As shown, the plotter, generally 40, has a roll holder 44 which accommodates a roll of paper 42 therein. The paper web 42 is paid out from the roll holder 44 in a direction indicated by an arrow A, i.e., in a transport direction. A reverse roller pair 46, a write head 48, a developing section 50 having yellow (Y), magenta (M) and cyan (C) developing units, a transport roller pair 52, a cutter 54, and a discharge roller pair 56 are sequentially arranged in the transport direction A. The transport roller pair 52 holds the paper web 42 therebetween and, during a forward movement, drives the paper web 42 in the transport direction A without causing it to slip. The reverse roller pair 46 is rotated via a torque limiter, not shown, to drive the paper web 42 in the opposite direction to the transport direction A to thereby exert tension on the paper web 42. This prevents the paper web 42 from slackening at the write head 48 and developing section 50. A register mark sensor 58 plays the role of means for reading a register mark provided on the paper web 42. A first guide member in the form of a pressing member 60 is located to face the register mark sensor 58 with the intermediary of the paper web 42.

In operation, a register mark is formed on the paper web 42 prior to an image. When an image is to be formed on the paper web 42, the web 42 is transported by the transport roller pair 52 in the direction A. As soon as the register mark sensor 58 senses the register mark, the head 48 starts writing a Y latent image on the paper web 42. The Y developing unit included in the developing section 50 develops the Y latent image to produce a corresponding Y toner image. Thereafter, the reverse roller 46 returns the paper web 42 in the opposite direction to the direction A until the register mark sensor 58 senses the register mark again. As the sensor 58 senses the register mark, the transport roller pair 52 again drives paper web 42 in the direction A. When the register mark is sensed, the head 48 writes an M latent image over the Y toner image. The M latent image is developed by the M developing unit also included in the developing section 50. A C latent image is written over the resulting M toner image and then developed in the same manner, completing a color image on the paper web 42. While the development of the C latent image is under way, the cutter 54 cuts off the leading end portion of the paper web 42. Subsequently, the cutter 54 cuts off the trailing end portion of the paper web 42. In this condition, the transport roller pair 52 stops rotating while the discharge roller pair 56 drives the cut sheet carrying the full-color copy out of the plotter 40. Of course, the embodiment is practicable not only with three colors but also with four or more colors.

Figure 5A:
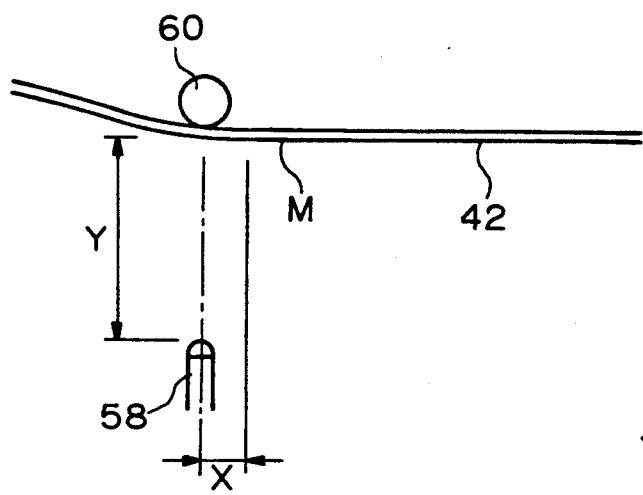
FIGS. 5A and 5B show a relation between the distance between a register mark provided on a paper web and a register mark sensor included in the embodiment and the sensing accuracy.
Figure 5B:
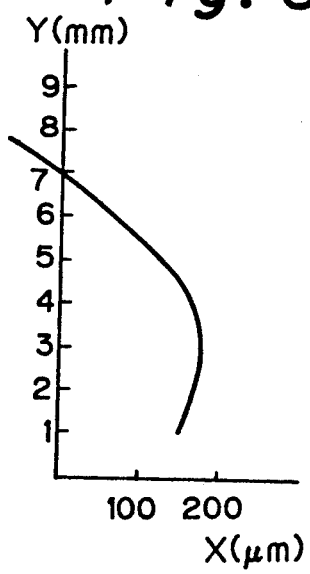

FIGS. 5A and 5B show a relation between the distance between the register mark sensor 58 and a register mark M and the sensing accuracy. To insure the positional accuracy in the event of repetitive sensing, the register mark sensor 58 is constituted by a photosensor which is a fiber having a lens for condensing light at the end thereof. This kind of sensor 58 has a problem that as the distance Y between the sensor 58 and the paper web 42 carrying the register mark M changes, the output of the sensor 58 and, therefore, the distance X between the mark M and the sensor 58 changes, as shown in FIG. 5B. Then, the color components for forming the full-color image on the paper web 42 will be brought out of register. In the illustrative embodiment, the pressing member 60 is located to face the sensor 58 to urge the paper web 42 which is held under tension. This is successful in maintaining the distance between the paper web 42 and the sensor 58 constant and, therefore, allowing the sensor 58 to sense the register mark M with accuracy.

The plotter 40 has an upper cover, not shown, which is openable in the event of maintenance or similar occasion. When the pressing member 60 is affixed to such an upper cover, it is likely that the member 60 is slightly dislocated relative to the register mark sensor 58 due to the play of a support portion. In light of this, first positioning means may used to hold the pressing member 60 at a predetermined position relative to the register mark sensor 58. Then, the sensing accuracy of the sensor 58 will be further enhanced. The first positioning means may be implemented as a positioning member mounted on a lower framework to which the register mark sensor 58 is affixed.

Figure 6:
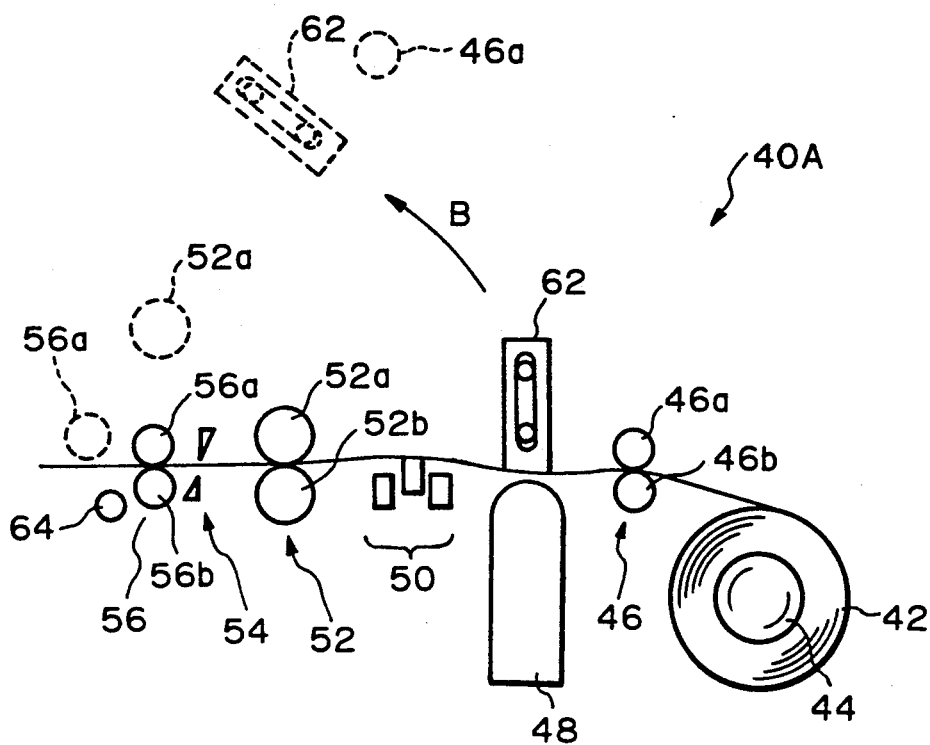
FIG. 6 is a view similar to FIG. 4, showing an alternative embodiment of the present invention.

Referring to FIG. 6, an alternative embodiment of the present invention will be described. In FIG. 6, the same parts and elements as those shown in FIG. 4 are designated by like reference numerals, and redundant description will be avoided for simplicity. As shown, the electrostatic plotter, generally 40A, has an ion-flow record head 48 and a second guide member in the form of a pressing member 62 which faces the head 48. The plotter 40A has an upper unit, not shown, which is rotatable up and down about a hinge 64, as indicated by an arrow B in the figure. One of discharge rollers 56a, one of transport rollers 52a, one of reverse rollers 46a and the pressing member 62 are mounted on the upper unit to be retractable together with the upper unit. Such a configuration promotes easy setting of the paper roll 42 and easy cleaning and other maintenance work associated with the head 48.

Figure 7:
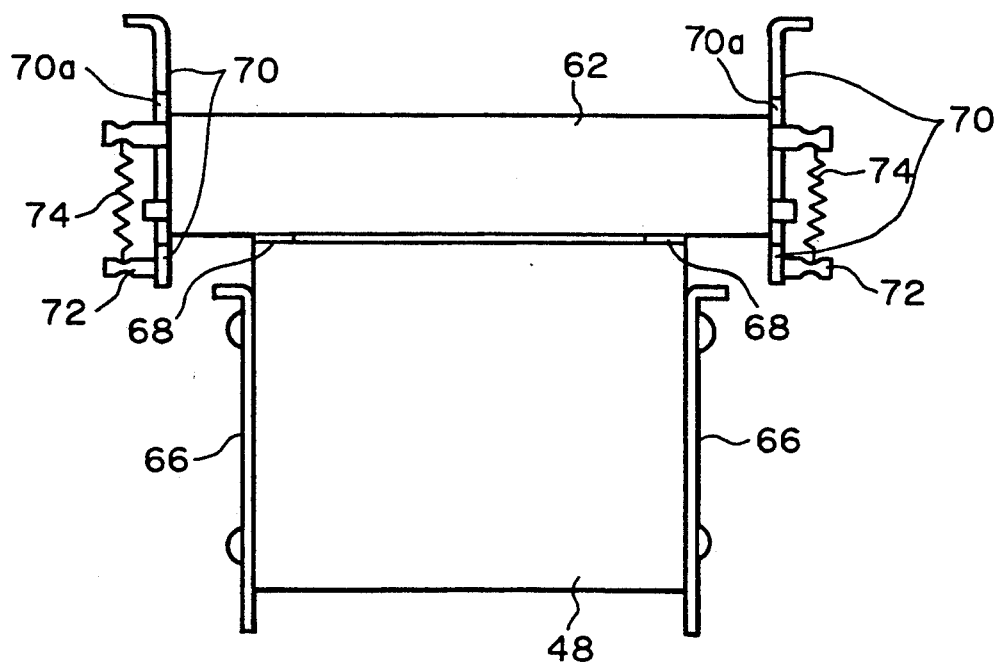
FIG. 7 shows a positional relation between a record head and a pressing member particular to the embodiment of FIG. 6.

FIG. 7 is a view of the pressing member 62 and head 48 as seen in a direction parallel to the intended direction of paper transport. As shown, the head 48 affixed to opposite lower side plates 66. Two positioning members 68 having the same thickness are affixed to the top of and at laterally opposite ends of the head 48. The pressing member 62 is constantly pulled by springs 74 which are anchored to pins 72 studded on upper side plates 70. The pressing member 62 is, therefore, urged against the positioning member 68 with the intermediary of the paper web 42 and, therefore, spaced apart from the head 48 by a uniform gap. Although the hinge 64 may have some play, the pressing plate 62 is accurately positioned relative to the head 48. It is to be noted that the movement of the pressing member 62 is guided by guide slots 70a formed through the upper side plates 70.

While the embodiment fixes the head 48 in place and allows the pressing member 62 to move relative to the head 48, it may be modified such that the head 48 is urged against the pressing member 62 which is stationary. Such an alternative configuration, however, will need strong springs and rigid side plates since the head 48 is relatively heavy.

In summary, it will be seen that the present invention provides a color image forming apparatus which maintains a paper web and a register mark sensor at a predetermined distance at a position where the former faces the latter and, therefore, allows the sensor to read a register mark with a positional accuracy of several microns. This insures high image quality by preventing color components for forming a full-color image from being brought out of register. Even when a first guide member is retracted together with part of the apparatus for maintenance or similar purpose, it can be restored to a predetermined position relative to the register mark sensor. Even an ion flow head is maintained at a predetermined distance from a paper web, insuring attractive images.

Various modifications will become possible for those skilled in the art after receiving the teachings of the present disclosure without departing from the scope thereof.

What is claimed is:

1. An image forming apparatus for forming an image on a recording medium being transported under tension, comprising:

a pair of rollers holding the recording medium under tension;

an ion-flow record head writing an image on the recording medium being transported by said pair of rollers;

a guide member located to face said ion-flow head and guiding the recording medium while urging said recording medium; and positioning means for maintaining said guide member at a predetermined position relative to said ion-flow record head said positioning means including means associated with said guide member for urging said guide member in a first direction and at least one positioning member disposed between said guide member and said record head for preventing movement of said guide member in said first direction beyond a predetermined spaced relationship between said guide member and said ion-flow record head.

2. The image forming apparatus of claim 1, wherein said means for urging includes at least one spring biasing said guide member toward said ion-flow record head, and wherein said positioning means includes two of said positioning members preventing said guide member from moving closer than a predetermined distance from said ion-flow record head.

3. The image forming apparatus of claim 2, wherein said positioning members are affixed to said ion-flow record head.

4. An image forming apparatus for forming an image on a recording medium being transported under tension comprising:

a pair of rollers holding the recording medium under tension;

an ion-flow record head writing an image on the recording medium being transported by said pair of rollers;

a guide member located to face said ion-flow record head, said guide member guiding the recording medium while maintaining said recording medium a predetermined distance from said ion-flow record head;

biasing means associated with said guide member for applying a biasing force to said guide member to urge said guide member toward said ion-flow record head; and a spacer disposed between said guide member and said ion-flow record head and mounted upon one of said guide member and said ion-flow record head, such that said guide member and said ion-flow record head are urged against one another through said spacer, said spacer having a predetermined thickness preventing contact between said guide member and said record head, and such that a spacing between the guide member and the record head is maintained by said thickness of said spacer.

5. The image forming apparatus of claim 4, wherein a pair of spacers are provided mounted upon said ion-flow record head, and wherein said guide member includes a pressing member having first and second ends received in slots of respective first and second side plates, and wherein said biasing means biases said pressing member toward said ion-flow record head, and wherein said pressing member is movable with respect to said side plates along said slot.

6. The image forming apparatus of claim 1, wherein said positioning means maintains said guide member at a constant spaced distance from said ion-flow head, and wherein the recording medium passes over said guide member in contact therewith.

7. An image forming apparatus for forming an image on a recording medium comprising:

a pair of feed rollers transporting said recording medium;

a record head;

a movably mounted guide member guiding the recording medium while maintaining said recording medium a predetermined distance from said record head, said movably mounted guide member movable between at least a first position and a second position, wherein in said first position said movably mounted guide member faces said record head to guide the recording medium, and wherein in said second position said movably mounted guide member is remote from said record head relative to said first position; and at least one spacer disposed between said record head and said movably mounted guide member when said movably mounted guide member is in said first position, said at least one spacer maintaining a predetermined spacing between said guide member and said record head.

8. The image forming apparatus of claim 7, further including a hinge movably mounting said movably mounted guide member such that said movably mounted guide member is movable between said first and second positions about said hinge.

9. The image forming apparatus of claim 7, further including biasing means for urging said movably mounted guide member against said at least one spacer when said movably mounted guide member is in said first position.

10. The image forming apparatus of claim 8, further including biasing means for urging said movably mounted guide member against said at least one spacer when said movably mounted guide member is in said first position.

11. An image forming apparatus for forming an image on a recording medium being transported under tension comprising:

a pair of rollers holding the recording medium under tension;

an ion-flow record head writing an image on the recording medium being transported by said pair of rollers;

a guide member located to face said ion-flow record head, said guide member guiding the recording medium while maintaining said recording medium a predetermined distance from said ion-flow record head;

biasing means associated with said record head for applying a biasing force to said ion-flow record head to urge said record head toward said guide member; and a spacer disposed between said guide member and said ion-flow record head and mounted upon one of said guide member and said ion-flow record head, such that said guide member and said ion-flow record head are urged against one another through said spacer, said spacer having a predetermined thickness preventing contact between said guide member and said record head, and such that a spacing between the guide member and the record head is maintained by said thickness of said spacer.

* * * * *